Feb. 19, 1924. 1,483,926
C. B. CHADWICK ET AL
CHECK GUARANTY CERTIFICATE
Filed June 4, 1921

Patented Feb. 19, 1924.

1,483,926

UNITED STATES PATENT OFFICE.

CLARENCE B. CHADWICK AND JAMES R. MacPHERSON, OF CHICAGO, ILLINOIS, ASSIGNORS TO THE BANKERS SUPPLY CO., OF CHICAGO, ILLINOIS, A CORPORATION OF COLORADO.

CHECK-GUARANTY CERTIFICATE.

Application filed June 4, 1921. Serial No. 474,955.

*To all whom it may concern:*

Be it known that we, CLARENCE B. CHADWICK and JAMES R. MACPHERSON, both citizens of the United States, residing at Chicago, in the county of Cook and State of Illinois, have invented certain new and useful Improvements in Check-Guaranty Certificates, of which the following is a specification.

The certificate of the present invention is intended for use in connection with a system of insuring bank depositors against loss due to the alteration of checks printed and written on safety paper of a specified character and drawn on certain designated banks. In the furtherance of this plan, each of the depositors is furnished with a check book having checks printed on safety paper of the specified character and becomes a beneficiary under the terms of a master bond on display in the bank. The depositor is furnished with the guaranty certificate booklet of the present invention, which constitutes an instrument for establishing the identity of the depositor and briefly summarizes the character of the guaranty afforded. A portion of said booklet is printed upon a sample of safety paper identical with that employed in the printing of checks, and thus serves to distinctly set forth the nature of the obligation of insurance which is carried by the bank for the benefit of the depositor.

In the working out of the system involved, the manufacturers of safety paper are the parties who ultimately assume the obligation as a means for furthering the sale of safety paper of specified quality, so that the system involved operates for the benefit both of the bank and its depositors.

The present invention, however, is concerned primarily with the formation of the depositor's booklet which finds its utility in connection with the transactions outlined above.

In the drawings;

Figure 1 is a view of the front and back covers of the booklet opened up to display two covers; and Fig. 2 is a view of the inside of the booklet.

The booklet is in the form of a folder consisting of a front cover 10, a rear cover 11, the first inside page 12, and a second inside page 13. The front cover contains an inscription indicating that the booklet constitutes, in effect, a bond for the protection of the depositor named thereon, and sets forth the name of the bank acting as depository under the terms of the agreement, together with a number or other mark identifying the particular booklet. The first inside page 12 is provided with a space 14 devoted to a short summary of the terms and conditions of the obligations of insurance which sets forth that the said obligation is undertaken in conformity with the terms and provisions of the master bond on display in the bank involved. The same page is also provided with a space 15 which constitutes a fac-simile reproduction of the type of safety paper employed in the printing of the checks protected by the provisions of the bond, which check paper space has inscribed thereon the corporate signature 16 of the paper company furnishing the check safety paper, and also the corporate signature 17 of the guaranty company primarily liable to the depositor on account of the loss due to the alteration of checks properly subscribed on the safety check blanks manufactured by the paper company and furnished to the bank for distribution to its depositors.

The second sheet of the booklet thus constitutes not only a duly executed obligation of insurance in favor of the depositor, but also constitutes an identification of the particular type of check paper protected, so that the depositor is thus in possession of an instrument, which concisely sets forth not only the legal terms and conditions of the obligation, but also the properties of the paper constituting the checks which are subject to the protection afforded.

The second inner page 13 is devoted to the data required for the personal identification of the depositor, this page, therefore, constituting a means for the protection of the bank in honoring checks purporting to be drawn by the particular depositor holding the booklet. Said page 13 is thus provided with a line 18 for the reception of the depositor's signature, a space 19 for having printed thereon the finger prints of the depositor, and a space 20 which may, if desired, be utilized for the insertion of the depositor's photograph.

The rear outer cover page constitutes the bank's certification of the genuineness of the data identifying the depositor, and preferably comprises spaces devoted to the name, personal address, business connection, business address, and business capacity of the depositor, or other like data, serving to identify the party insured followed by a certification of genuineness and subscribed by the corporate signature of the bank and the date of issuance of the booklet. The booklet thus comprises in abbreviated form a contract of guaranty on behalf of the depositor, an identification of the check paper to which the contract of guaranty applies, an identification of the holder of a booklet, and a bank certification that said identifying marks are authentic.

The above component parts, which are essential to the mutual protection of the several parties involved, are united together in a single booklet, so that the several portions thereof are immediately subjected to mutual comparison of checking all aspects of any particular transaction. The system to which the booklet pertains is one devised for the mutual benefit of all parties concerned; that is to say, the safety paper manufacturer's profits by an increased sale of safety paper, the guaranty company by the premiums paid for the bonds issued, the bank by an increase in its number of depositors, and each depositor by the protection afforded to the checks drawn above his signature.

The booklet, as a whole, is devised with a view of preventing any mutilation or alteration of any of its component parts, being so devised as to guard the lawful holder thereof against any possible simulation of his identity by another in case of loss of the booklet, and the certification of the lawful holder's identifying marks by the bank is so designed as to promote the convenience and safety of the holder in the conduct of any of the transactions contemplated.

We claim:

1. In an instrument of the kind described, the combination of a section constituting a contract of guaranty against check alteration, and a section constituting a sample of said check paper, substantially as described.

2. In an instrument of the kind described, the combination of a section constituting a contract of guaranty against check alteration, a section constituting a sample of said check paper, and a section constituting a record of personal data identifying the depositor, substantially as described.

3. In an instrument of the kind described, the combination of a section constituting a contract of guaranty against check alteration, a section constituting a sample of said check paper, a section constituting a record of personal data identifying the depositor, and a section constituting the bank's certification of the genuineness of said personal identifying data, substantially as described.

4. In a booklet of the class described, the combination of a front cover page constituting a statement concerning the obligation of guaranty and containing the name of the insured, a page constituting the contracted guaranty, said page including a sample of the check safety paper involved in the guaranty, and a section below said check paper containing the signature of the party undertaking the contracted guaranty, a page constituting a record of personal data identifying the insured, and an outer cover page constituting a certificate by the bank to the genuineness of the identifying data, substantially as described.

5. In an instrument of the character described, the combination of a section constituting a contract of guaranty for the protection of checks of a specified character, a section constituting a sample of said check paper, and a section below said check sample containing the signature of the party undertaking the obligation of guaranty, substantially as described.

CLARENCE B. CHADWICK.
JAMES R. MacPHERSON.